United States Patent
Pfaff et al.

(10) Patent No.: US 7,416,688 B2
(45) Date of Patent: Aug. 26, 2008

(54) TRANSPARENT CONDUCTIVE PIGMENTS

(75) Inventors: Gerhard Pfaff, Muenster (DE); Reinhold Rueger, Roedermark (DE); Otto Stahlecker, Darmstadt (DE); Frank Ott, Griesheim (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 413 days.

(21) Appl. No.: 11/130,229

(22) Filed: May 17, 2005

(65) Prior Publication Data

US 2005/0253117 A1    Nov. 17, 2005

(30) Foreign Application Priority Data

May 17, 2004   (DE) .................. 10 2004 024 806

(51) Int. Cl.
*H01B 1/08* (2006.01)
*B05D 5/12* (2006.01)

(52) U.S. Cl. .............. 252/518.1; 252/520.1; 252/521.3; 106/415; 106/455; 427/108; 427/126.2; 427/126.3

(58) Field of Classification Search .............. 252/518.1, 252/520.1, 521.3; 106/415, 455; 523/200; 428/918; 427/108, 126.2, 126.3
See application file for complete search history.

(56) References Cited

U.S. PATENT DOCUMENTS

| | | | |
|---|---|---|---|
| 3,331,699 A * | 7/1967 | Marshall et al. ............. | 106/415 |
| 4,568,609 A | 2/1986 | Sato et al. | |
| 5,236,737 A | 8/1993 | Linton | |
| 5,320,781 A | 6/1994 | Stahlecker et al. | |
| 5,350,448 A * | 9/1994 | Dietz et al. ................. | 106/441 |
| 5,472,640 A | 12/1995 | Brückner et al. | |
| 5,585,037 A | 12/1996 | Linton | |
| 5,628,932 A * | 5/1997 | Linton ..................... | 252/521.5 |
| 6,017,981 A * | 1/2000 | Hugo ......................... | 523/216 |
| 2006/0223910 A1 * | 10/2006 | Bagala, Sr. .................. | 523/200 |

FOREIGN PATENT DOCUMENTS

JP    2002-155240    *   5/2002

\* cited by examiner

*Primary Examiner*—Mark Kopec
(74) *Attorney, Agent, or Firm*—Millen, White, Zelano & Branigan, P.C.

(57) ABSTRACT

Disclosed are transparent conductive pigments of flake-form substrates coated with a conductive layer, where the number-weighted mean particle area $F_{50}$ of the transparent conductive pigments is greater than or equal to 150 μm$^2$, and processes for the production of the pigments, and the use thereof.

16 Claims, No Drawings

TRANSPARENT CONDUCTIVE PIGMENTS

The present invention relates to transparent conductive pigments comprising flake-form substrates coated with a conductive layer, where the number-weighted mean particle area $F_{50}$ of the transparent conductive pigments is greater than or equal to 150 µm², to processes for the production of the pigments, and to the use thereof.

Electrically conductive pigments are today employed in various areas of application, for example for antistatic coatings, antistatic floorcoverings, antistatic treatment of explosion-protected rooms or electrically conductive primers for the painting of plastics. The use of carbon black or graphite is common for increasing the conductivity. These substances have the disadvantage that they do not have transparency and result in a dark coloration of the materials to which they are added.

Also known are electrically conductive pigments based on transparent flake-form substrates, in particular based on thin mica flakes. These pigments consist of mica coated with $(Sn,Sb)O_2$ or with a layer sequence comprising $TiO_2/SiO_2/(Sn,Sb)O_2$ (for example Minatec® 31 CM or 30 CM from Merck KGaA). Pigments of this type are described, for example, in the patents DE 38 42 330, DE 42 37 990, EP 0 139 557, EP 0 359 569 and EP 0 743 654.

All these pigments are distinguished, in particular, over the conductive pigment carbon black, which is principally customary, through the fact that they have a pale colour and higher transparency. For this reason, these pigments have essential advantages in application compared with carbon black since they give the stylist crucial additional latitude with respect to the colour of the application system (paints, plastics, printing inks). Thus, colour and electrical conductivity can be combined in a very good manner, whereas one is always restricted to dark colours on use of carbon black. Overall, however, the requirement for particularly transparent and pale conductive pigments has hitherto not been met.

There are extremely high requirements regarding transparency on use of conductive pigments in varnish coats, printing inks and transparent or translucent plastic articles, for example films, containers, cards or sheets. For these applications, it is not sufficient for the conductive pigment to be only weakly coloured or grey, since the light scattering by the pigments becomes increasingly noticeable in the more highly transparent media. The outer conductive coating of the pigment particles consists of metal oxides whose refractive index is higher than that of the common binders in paints, coatings or plastics. For this reason, the pigments embedded in a polymer matrix act as centres of scattering for light, resulting in a haze of the layers containing the pigments. This also occurs if the pigment particles are themselves highly transparent. The haze is more crucial the more transparent the medium is per se. Clear plastic films and varnish coats are particularly sensitive. If pigments from the prior art, for example Minatec® 31 CM, are added to these materials, they appear very hazy when looked through and white to pale grey when looked at. Although lowering the pigment concentration enables the haze to be reduced, this is, however, associated with a disproportionately large drop in conductivity and is therefore not a feasible alternative for the users. There is therefore an urgent demand for electrically conductive pigments having improved transparency in the application medium with retention of good conductivity.

Surprisingly, it has been found that pigments in accordance with the present invention meet this requirement profile. The present invention therefore relates to transparent conductive pigments comprising flake-form substrates coated with a conductive layer, where the number-weighted mean particle area $F_{50}$ of the transparent conductive pigments is greater than or equal to 150 µm². The present invention furthermore relates to processes for the production of the pigments according to the invention, comprising the coating of flake-form substrates with a conductive layer, where the proportion of flake-form substrates or transparent conductive pigments having a particle area of less than 150 µm² is reduced, before and/or after the coating with a conductive layer, in such a way that the mean number-weighted particle area $F_{50}$ of the transparent conductive pigments is greater than or equal to 150 µm². The present invention likewise relates to the use of the pigments according to the invention in paints, coatings, printing inks, plastics, floorcoverings, films, formulations, ceramic materials, glasses, paper, for laser marking, in heat protection, in dry preparations or in pigment compositions.

Electrically conductive pigments in accordance with the present invention have the advantage that they exhibit improved transparency of the conductive material at the same time as higher conductivity compared with those from the prior art, even at the same use concentration. The reduced fines contents in accordance with the present invention of the flake-form conductive pigments apparently make a disproportionately low contribution to the conductivity in the application, but a disproportionately high contribution to light scattering. The increase in conductivity enables a reduction in the use concentration of the pigment and thus a further improvement in the transparency (lower haze) in the respective application.

The conductive pigments according to the invention are based on flake-form substrates which are coated with a conductive layer. Suitable flake-form substrates are in principle all transparent flake-form substrates, which can be selected, for example, from the group consisting of flake-form $TiO_2$, synthetic or natural mica, phyllosilicates, glass flakes, flake-form $SiO_2$ and/or flake-form $Al_2O_3$. The flake-form substrates are preferably mica, flake-form $SiO_2$ or glass flakes.

The electrically conductive layer comprises one or more doped metal oxides, where the metal oxide is preferably tin oxide, zinc oxide, indium oxide and/or titanium oxide. The metal oxide is preferably tin oxide, indium oxide and/or zinc oxide. The said metal oxides are in doped form in the conductive layer, where the doping can take place with gallium, aluminium, indium, thallium, germanium, tin, phosphorus, arsenic, antimony, selenium, tellurium and/or fluorine. Single dopants of those mentioned, but also combinations thereof, may be present in the conductive layer. Aluminium, indium, tellurium, fluorine and/or antimony are preferably employed for the doping of the metal oxides. The proportion of the dopants in the conductive layer can be from 0.1 to 30% by weight, preferably in the range from 2 to 15% by weight. In a particularly preferred embodiment, the conductive layer employed is antimony-doped tin oxide, antimony- and tellurium-doped tin oxide, tin-doped indium oxide, aluminium-doped zinc oxide or fluorine-doped tin oxide, with antimony-doped tin oxide being particularly preferred. The tin to antimony ratio in this preferred combination can be from 4:1 to 100:1, preferably from 7:1 to 50:1. Lower antimony contents adversely affect the conductivity, whereas higher antimony contents reduce the transparency of the pigments according to the invention.

The proportion of the conductive layer, based on the flake-form substrate, can be from 25 to 120% by weight, preferably from 50 to 75% by weight.

An important feature of the conductive pigments according to the invention is the number-weighted mean particle area $F_{50}$ of the transparent conductive pigments, which should be greater than or equal to 150 µm². The number-weighted mean particle area $F_{50}$ of the transparent conductive pigments is preferably greater than or equal to 200 µm². The transparent, conductive pigments according to the invention are thin flakes having an average thickness of 2 µm or less, preferably of 0.3-0.6 µm, and a form factor of at least 50, preferably greater than 100. Another important feature for the functioning of the conductive pigments in the dielectric application media is the particle area. Flakes having a relatively large particle area are more suitable for the formation of electrically conductive paths in dielectric media than relatively small flakes, since fewer relatively large flakes have to come into contact for the same path length than in the case of relatively small flakes. Since the dielectric medium surrounding the pigments acts as insulator and prevents the transfer of charge from pigment particle to pigment particle, a conduction path consisting of a large number of small conductive particles is less conductive than a path of equal size consisting of a smaller number of relatively large particles.

The transparent conductive pigments according to the invention are therefore best characterised by their particle area. This is taken to mean the value for the size of the principal face of the flakes, i.e. the face with the longest axis. The flakes themselves may be approximately circular or also oblong, and the shape may be more or less regular. In general, the flakes are somewhat oblong with a mean ratio between the principal axis and the secondary axis (elongation factor) of about 1.2. The particle size distribution of the pigments according to the invention can vary in broad ranges, depending on the requirements of the applications. For use in surface coatings, narrower particle size distributions are necessary than, for example, for use in plastic articles. Thus, the number-weighted particle area $F_{95}$ for surface-coating applications, offset or gravure printing inks should be not more than 1500 µm², preferably not more than 1200 µm², i.e. a maximum of 5% of the particles have a particle area of 1500 µm², preferably of 1200 µm² or more. In plastic applications, by contrast, a number-weighted particle area $F_{95}$ of 7500 µm² with a number-weighted mean particle area $F_{50}$ of 1200 µm² is still acceptable. In general, a narrow particle size distribution of the pigment is favourable with respect to the applicational properties, and the value of $F_{95}$ should therefore preferably be from 5 to 7 times the value of $F_{50}$. However, the proportion of fine grains in the pigment is important for the transparency of the medium comprising the transparent conductive pigment.

It has proven particularly advantageous for the number-weighted proportion of flakes having a particle area of less than 80 µm² to be less than or equal to 33%, based on the transparent conductive pigments. The proportion of flakes having a particle area of less than 80 µm² is preferably less than 25%. Particularly advantageous results with respect to conductivity and transparency of the respective applications are achieved if the proportion of flakes having a particle area of less than 40 µm² is less than or equal to 15%, preferably less than or equal to 10%, based on the transparent conductive pigments. The said reduction in the fines proportions reduces light scattering and thus the haze in the applications, meaning that systems which appear particularly transparent, but at the same time have a conductivity appropriate to requirements are obtained.

In a further embodiment, one or more layers comprising metal oxides, metal oxide hydrates, metal suboxides, metal fluorides, metal nitrides, metal oxynitrides or mixtures of these materials may be located above and/or below the conductive layer. The application of these additional layers enables the colour properties of the pigments to be matched to the users' requirements, in particular if the additional layers are located below the conductive layer. The application of additional layers above the conductive layer enables the conductivity in the applications comprising these pigments to be matched to requirements. The application of additional layers in the pigments according to the invention thus enables targeted control of the colour impression and conductivity in the respective applications. The metal oxide, metal oxide hydrate, metal suboxide, metal fluoride, metal nitride or metal oxynitride layers or the mixtures thereof can be of low refractive index (refractive index <1.8) or high refractive index (refractive index $\geq$1.8). Suitable metal oxides and metal oxide hydrates are all customary metal oxides or metal oxide hydrates to be applied as layers, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixed phases thereof, such as, for example, ilmenite or pseudobrookite. Metal suboxides which can be employed are, for example, titanium suboxides. A suitable metal fluoride is, for example, magnesium fluoride. Metal nitrides or metal oxynitrides which can be employed are, for example, the nitrides or oxynitrides of the metals titanium, zirconium and/or tantalum. Preference is given to the application of metal oxide, metal fluoride and/or metal oxide hydrate layers and very particularly preferably metal oxide and/or metal oxide hydrate layers above and/or below the conductive layer. It is furthermore also possible for multilayered structures comprising high- and low-refractive-index metal oxide, metal oxide hydrate or metal fluoride layers to be present, preferably with high- and low-refractive-index layers alternating. Particular preference is given to layer packages comprising a high-refractive-index layer and a low-refractive-index layer, it being possible for one or more of these layer packages to be applied above and/or below the conductive layer. The sequence of the high- and low-refractive-index layers here can be matched to the substrate in order to include the latter in the multilayered structure. Conductive pigments comprising these layers may exhibit an angle-dependent change in the colour (colour flop) due to interference given a suitable choice of the materials and the respective proportions.

In a preferred embodiment, the outer layer of the above-mentioned single or multiple layers is a high-refractive-index metal oxide. This outer layer may additionally be on the above-mentioned layer packages or, in the case of high-refractive-index substrates, may be part of a layer package and can consist, for example, of $TiO_2$, titanium suboxides, $Fe_2O_3$, $SnO_2$, $ZnO$, $ZrO_2$, $Ce_2O_3$, $CoO$, $Co_3O_4$, $V_2O_5$, $Cr_2O_3$ and/or mixed phases thereof, such as, for example, ilmenite or pseudobrookite. $TiO_2$ is particularly preferred.

The proportion and thus the thickness of the individual layers, in particular of the metal oxide layers, is generally not crucial. Overall, however, the layer thicknesses of the single or multiple additional layers should be set in such a way that the transparency of the conductive pigments according to the invention is not significantly reduced.

Particularly preferred pigments of the present invention comprise mica coated with an antimony-doped tin oxide layer, mica coated with a titanium oxide layer, a silicon oxide layer and an antimony-doped tin oxide layer, or mica coated with an antimony-doped tin oxide layer and a metal oxide layer, in particular a titanium oxide layer.

The present invention likewise relates to processes for the production of the pigments according to the invention, comprising the coating of flake-form substrates with a conductive layer, characterised in that the proportion of flake-form substrates or transparent conductive pigments having a number-weighted particle area of less than 150 µm² is reduced, before and/or after the coating with a conductive layer, in such a way that the number-weighted mean particle area $F_{50}$ of the transparent conductive pigments is greater than or equal to 150 µm². The proportion of flake-form substrates or transparent conductive pigments having a particle area of less than 200 µm² is preferably reduced in such a way that the number-weighted mean particle area $F_{50}$ of the transparent conductive pigments is greater than or equal to 200 µm². This can be achieved, for example, by reducing the proportion of pigments having a particle area of less than 80 µm² to less than 33%, preferably to less than 25%, based on the transparent conductive pigments. In addition, the proportion of pigments having a β2 particle area of less than 40 µm can be reduced in the processes according to the invention to less than 15%, preferably to less than 10%, based on the transparent conductive pigments. This reduction in the fines contents is crucial for the improved properties of the pigments according to the invention and can be carried out either as early as during the grinding and classification of the flake-form substrate or at the end of the production process on the crude product. The fines can be removed by sedimentation, decantation, air classification and/or sieving. In the case of sedimentation, ground crude mica can, for example, be sedimented a number of times as early as during the grinding and classification process. Classification of ground mica by air classification is also possible, but in this process variant the mica must be dried. The mica classified in this way with a reduced fines content is then provided with a conductive layer. However, the reduction in the fine fraction can also be carried out from the conductive pigment after coating with a conductive layer, for example by multiple sedimentation of the crude product and removal of the relatively small, relatively slowly sedimenting particles by decantation. Finally, classification of the dried and calcined pigment by air classification or sieving is also possible. The reduction in the fines content is monitored, for example, by measurement under the microscope and counting the measured particles. This can also be carried out visually, if desired simplified by comparison of the samples against counted standards or automatically with the aid of a video camera and suitable automatic image analysis software. Automatic evaluation systems of this type for particle size analysis are known to the person skilled in the art and are commercially available. For statistically reliable particle size analysis, at least 1000, preferably 2000, particles or more should be measured.

The coating of the flake-form substrates with a conductive layer is carried out by the coating methods known from the prior art, preferably by wet-chemical methods.

In a simplest embodiment of the processes according to the invention, a layer of a doped metal oxide, metal hydroxide or metal oxide hydrate is applied to the flake-form substrate from suitable precursors. The precursors for the metal oxide and the doping can either be applied separately, preferably continuously, or as a mixture with one another, i.e. jointly in a solution. Suitable precursors are the corresponding halides, nitrates, sulfates, phosphates or oxalates, preferably the corresponding halides. Processes of this type are described, for example, in DE 42 37 990, DE 38 42 330, EP 0 139 557, the disclosure content of which is hereby incorporated by way of reference. Optimisation of the application conditions is within the field of expertise of the person skilled in the art. In the case of wet coating, the substrates are usually suspended in water, and one or more hydrolysable metal salts are added at a pH which is suitable for hydrolysis, which is selected in such a way that the metal oxides, metal hydroxides or metal oxide hydrates are precipitated directly onto the flakes without secondary precipitation occurring. The pH is usually kept constant by simultaneous metered addition of a base or acid. After application of the conductive layer, the pigments are separated off, dried and generally calcined in air or under inert gas or reducing conditions, usually at temperatures of from 300 to 900° C., preferably at temperatures of from 650 to 850° C.

In a further embodiment of the processes according to the invention, one or more layers comprising metal oxides, metal oxide hydrates, metal suboxides, metal fluorides, metal nitrides, metal oxynitrides or mixtures of these materials are applied before and/or after the coating of the flake-form substrates with a conductive layer. The single or multiple layers can be applied by wet-chemical methods, by means of sol-gel methods or by CVD and/or PVD processes. Coating with these materials is preferably carried out by wet-chemical methods.

After application of the conductive layer, the pigments may, if desired, be separated off, dried and optionally calcined and then re-suspended again for the deposition of further additional layers. In an alternative embodiment, firstly all desired layers can be deposited and subsequently calcined as a whole.

Owing to their advantageous properties, the pigments according to the invention are suitable for a wide range of applications. The invention therefore also relates to the use of the pigments according to the invention in paints, coatings, printing inks, plastics, in security applications, floorcoverings, films, formulations, ceramic materials, glasses, paper, for laser marking, in heat protection, in dry preparations or in pigment compositions.

In the case of formulations, the pigments according to the invention are particularly suitable for formulations which are intended to have conductivity, for example conductive pastes. The pigments according to the invention can of course also be combined in the formulations with raw materials and auxiliaries of any type. These include, inter alia, oils, fats, waxes, film formers, preservatives and auxiliaries which generally determine applicational properties, such as, for example, thickeners and rheological additives, such as, for example, bentonites, hectorites, silicon dioxide, Ca silicates, gelatine and/or surface-active auxiliaries, etc.

In the case of the use of the pigments in paints and coatings, all areas of application known to the person skilled in the art are possible, such as, for example, powder coatings, automobile paints, printing inks for gravure, offset, screen or flexographic printing, and coatings in outdoor applications. A multiplicity of binders, in particular water-soluble grades, is suitable for the preparation of printing inks, for example based on acrylates, methacrylates, polyesters, polyurethanes, nitrocellulose, ethylcellulose, polyamide, polyvinyl butyrate, phenolic resins, maleic resins, starch or polyvinyl alcohol. The paints and coatings can be water- or solvent-based coatings, with the choice of the coating constituents being subject to the general knowledge of the person skilled in the art.

In addition, the pigments according to the invention can be used, in particular, for the production of conductive films and plastics, for example for conductive films and sheets, plastic containers and mouldings for all applications that require conductivity which are known to the person skilled in the art. Suitable plastics for the incorporation of the conductive pigments according to the invention are all common plastics, for example thermosets or thermoplastics. The description of the possible applications and the plastics which can be employed, processing methods and additives are given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is also incorporated herein.

The pigments according to the invention are likewise suitable for use in blends with organic dyes, pigments and/or further conductive materials, such as, for example, carbon black, transparent and opaque white, coloured and black pigments, and with flake-form iron oxides, organic pigments, holographic pigments, LCPs (liquid crystal polymers) and conventional transparent, coloured and black lustre pigments based on metal oxide-coated flakes based on mica, metal, glass, $Al_2O_3$, $Fe_2O_3$, $SiO_2$, etc.

The pigments according to the invention can be mixed in any ratio with commercially available pigments and fillers. Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances.

The pigments according to the invention are furthermore suitable for the preparation of flowable pigment compositions and dry preparations comprising one or more pigments according to the invention, binders and optionally one or more additives. The term dry preparations is also taken to mean preparations which comprise from 0 to 8% by weight, preferably from 2 to 8% by weight, in particular from 3 to 6% by weight, of water and/or a solvent or solvent mixture. The dry preparations are preferably in the form of pellets, granules, chips, sausages or briquettes and have particle sizes of 0.2-80 mm.

The following examples are intended to explain the invention in greater detail, but without limiting it.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

EXAMPLES

Example 1

Preparation Variant A for Samples 1 and 2 a) Classification of the Substrates:

Crude mica is finely ground in an edge mill and classified into various fractions which differ in particle size and particle spectrum with the aid of a decanter. The fractions are listed in Table 1 with their particle size, characterised by the number-weighted mean particle area $F_{50}$ and the fines content, based on flake-form particles below 80 µm² and below 40 µm² in % measured on the particle number.

b) Coating of the Substrates with Conductive Layer:

100 g of mica in accordance with Table 1 are suspended in 1900 ml of deionised water and adjusted to pH 2.1 using hydrochloric acid. A mixture of 191.8 g of an aqueous $SnCl_4$ solution (50% by weight), 56 ml of HCl (37% by weight), 20.4 g of an aqueous $SbCl_3$ solution (35% by weight) is metered into the suspension continuously over the course of 7 hours at 75° C. with stirring. The pH is kept constant by simultaneous regulated metered addition of sodium hydroxide solution. When the total amount of 290 ml of the solution has been added, the mixture is stirred at 75° C. for a further 30 min, subsequently cooled to room temperature with stirring, and the reaction mixture is adjusted to pH 3. The pigment obtained is filtered off via a suction filter, washed with water, dried at 140° C. and calcined at 800° C. for 30 min, giving 158 g of a pale-grey pigment powder. The Sn:Sb ratio in the coating is about 92:8.

Example 2

Preparation Variant B for Samples 1 and 2 a) Coating of the Substrates with Conductive Layer:

Ground mica having a high fines content is coated with conductive antimony-tin oxide analogously to Example 1b).

b) Classification of the Conductive Pigments:

21 kg of the crude pigment obtained in this way are classified by air classification. 3 kg of fines, preferably fines having a particle area of below 80 µm², are separated off in the process. 18 kg of pigment according to Table 1 are obtained.

Comparative Examples (Samples 3 and 4)

Samples 3 and 4 are prepared analogously to Example 1 by corresponding coating with conductive antimony-tin oxide.

Testing of the Conductivity in the Coating Film:

The samples according to Table 1 are dispersed in NC lacquer (6% of collodium and 6% of butyl acrylate-vinyl isobutyl ether copolymer in a solvent mixture). Glass plates are coated with the lacquer preparation. A glass plate is coated with lacquer without pigment. The concentration of the conductive pigments in the dry lacquer layer is 48% by weight, and the layer thickness is 40 µm. After drying of the lacquer layers, the leakage resistance is measured in accordance with DIN 53482 with the aid of a spring-tongue electrode. The results are shown in Table 1. The comparative lacquer film (sample 5) without conductive pigment has a resistance of >10 kiloohm.

Measurement of the Haze:

The pigments according to Table 1 are dispersed in NC lacquer (6% of collodium and 6% of butyl acrylate-vinyl isobutyl ether copolymer in a solvent mixture). PET films (thickness 100 µm) are coated with the lacquer preparation using a hand coater. The layer thickness of the dry layer is 60 µm, and the concentration of the pigments in the lacquer is 14% by weight, based on the binder. In order to determine the haze, the coated films are measured in a UV-VIS-IR spectrometer (model: Perkin Elmer Lambda 900) with Ulbricht sphere (150 mm diameter). The total transmission (diffuse+directed transmission) of the samples and the diffuse transmission are measured. The proportion of diffuse transmission in the total transmission is a measure of the haze of the samples. For comparison of the samples, a haze factor (H) is determined, defined as the percentage of diffuse transmission ($T_d$) in the total transmission ($T_{tot}$) in accordance with the formula $$H[\%] = (T_d/T_{tot})*100.$$

The transmission is measured in the spectral range 400-700 nm. The results are shown in Table 1. They show that only the coatings containing the pigments according to the invention exhibit good conductivity and low haze and thus improved transparency.

TABLE 1

| Sample | $F_{50}$ [μm²] | $C_{particle}$ <80 μm² [%] | $C_{particle}$ <40 μm² [%] | Conductivity [kΩ] | Haze factor H [%] | Notes |
|---|---|---|---|---|---|---|
| 1 | 195 | 21 | 13 | 4 | 30 | Invention |
| 2 | 230 | 14 | 8.5 | 10 | 22 | Invention |
| 3 | 36 | 74 | 54 | 100 | 41 | Comparison |
| 4 | 60 | 52 | 39 | 74 | 56 | Comparison |
| 5 | — | — | — | >$10^7$ | 7.6 | No pigment |

The entire disclosures of all applications, patents and publications, cited herein and of corresponding German application No. 10 2004 024 806.0, filed May 17, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Transparent conductive pigments comprising flake-form substrates coated with a conductive layer, wherein the number-weighted mean particle area $F_{50}$ of the transparent conductive pigments is greater than or equal to 150 μm².

2. Transparent conductive pigments according to claim 1, wherein the number-weighted mean particle area $F_{50}$ of the transparent conductive pigments is greater than or equal to 200 μm².

3. Transparent conductive pigments according to claim 1, wherein the proportion of pigments having a particle area of less than 80 μm² is less than or equal to 33%, based on the transparent conductive pigments.

4. Transparent conductive pigments according to claim 1, wherein the proportion of pigments having a particle area of less than 40 μm² is less than or equal to 15% by weight, based on the transparent conductive pigments.

5. Transparent conductive pigments according to claim 1, wherein the flake-form substrates selected from the group consisting of are flake-form $TiO_2$, synthetic or natural mica, phyllosilicates, glass flakes, flake-form $SiO_2$ flake-form $Al_2O_3$, or mixtures thereof.

6. Transparent conductive pigments according to claim 1, wherein the conductive layer comprises one or more doped metal oxides.

7. Transparent conductive pigments according to claim 6, wherein the metal oxide of the conductive layer selected from the group consisting of is tin oxide, zinc oxide, indium oxide, titanium oxide, or mixtures thereof.

8. Transparent conductive pigments according to claim 6, wherein the conductive layer comprising metal oxides is doped with an element selected from the group consisting of gallium, aluminium, indium, thallium, germanium, tin, phosphorus, arsenic, antimony, selenium, tellurium, fluorine, or mixtures thereof.

9. Transparent conductive pigments according to claim 1, wherein one or more layers comprising a material selected from the group consisting of metal oxides, metal oxide hydrates, metal suboxides, metal fluorides, metal nitrides, metal oxynitrides or a mixture thereof are located above and/or below the conductive layer.

10. A process for preparing transparent conductive pigments according to claim 1, comprising coating flake-form substrates with a conductive layer, and reducing the proportion of flake-form substrates or transparent conductive pigments having a particle area of less than 150 μm², before and/or after the coating with a conductive layer, such that the number-weighted mean particle area $F_{50}$ of the transparent conductive pigments is greater than or equal to 150 μm².

11. A process according to claim 10, wherein reducing the proportion of flake-form substrates or transparent conductive pigments is carried out by sedimentation, decantation, air classification and/or sieving.

12. A process according to claim 10, wherein coating the flake-form substrates with a conductive layer is carried out by a wet-chemical method.

13. A process according to claim 10, further comprising applying one or more layers a material selected from the group consisting of comprising metal oxides, metal oxide hydrates, metal suboxides, metal fluorides, metal nitrides, metal oxynitrides or a mixture thereof before and/or after coating the flake-form substrates with a conductive layer.

14. A process according to claim 13, wherein applying the one or more layers is carried out by a wet-chemical method, by a sol-gel process or by a CVD and/or PVD process.

15. A paint, coating, printing ink, plastic article, a security application, floorcovering, film, formulation, ceramic material, glass article, paper, laser marking, heat protection material, dry preparation or pigment composition comprising pigments according to claim 1.

16. A paint, coating, printing ink, plastic article, a security application, floorcovering, film, formulation, ceramic material, glass article, paper, laser marking, heat protection material, dry preparation or pigment composition according to claim 15, wherein the pigments are in a mixture with organic and/or inorganic colorants and/or conductive materials.

* * * * *

UNITED STATES PATENT AND TRADEMARK OFFICE
CERTIFICATE OF CORRECTION

PATENT NO. : 7,416,688 B2
APPLICATION NO. : 11/130229
DATED : August 26, 2008
INVENTOR(S) : Pfaff et al.

It is certified that error appears in the above-identified patent and that said Letters Patent is hereby corrected as shown below:

Column 9, line 47, reads "wherein the flake-form substrates selected from the group", should read --wherein the flake-form substrates are selected from the group--.

Column 9, line 48, reads "consisting of are flake-form $TiO_2$, synthetic or natural mica," should read --consisting of flake-form $TiO_2$, synthetic or natural mica--.

Column 9, line 49, after "$SiO_2$" insert --,--.

Column 10, line 2, after "layer", insert --is--.

Column 10, line 3, reads "the group consisting of is tin oxide, zinc oxide, indium oxide", should read --the group consisting of tin oxide, zinc oxide, indium oxide--.

Column 10, line 33, after "layers", insert --comprising--.

Column 10, line 34, after "of", delete "comprising".

Signed and Sealed this

Twelfth Day of May, 2009

JOHN DOLL
*Acting Director of the United States Patent and Trademark Office*